United States Patent
Manders et al.

(10) Patent No.: US 9,983,888 B2
(45) Date of Patent: May 29, 2018

(54) PREDICTIVE WRITING OF BOOTABLE IMAGES TO STORAGE NODES IN A CLOUD COMPUTING ENVIRONMENT

(71) Applicant: Verizon Patent and Licensing Inc., Arlington, VA (US)

(72) Inventors: Noah Manders, Burlington, MA (US); Ajay Aggarwal, Lowell, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 185 days.

(21) Appl. No.: 14/702,957

(22) Filed: May 4, 2015

(65) Prior Publication Data

US 2016/0328242 A1 Nov. 10, 2016

(51) Int. Cl.
*G06F 9/44* (2018.01)

(52) U.S. Cl.
CPC ............................. *G06F 9/4416* (2013.01)

(58) Field of Classification Search
CPC ..... H04L 67/10; H04L 67/1029; H04L 69/32; G06F 17/30233; G06F 8/63; G06F 15/16
USPC .......................................... 709/225; 707/803
See application file for complete search history.

(56) References Cited

U.S. PATENT DOCUMENTS

| 8,862,633 | B2* | 10/2014 | Friedman | G06F 8/63 707/803 |
|---|---|---|---|---|
| 9,292,350 | B1* | 3/2016 | Pendharkar | G06F 9/5044 |
| 2005/0055595 | A1* | 3/2005 | Frazer | G06F 8/665 713/400 |
| 2005/0151990 | A1* | 7/2005 | Ishikawa | G03G 21/043 358/1.14 |
| 2009/0276771 | A1* | 11/2009 | Nickolov | G06F 9/4856 717/177 |
| 2009/0300057 | A1* | 12/2009 | Friedman | G06F 11/3664 |
| 2011/0153697 | A1* | 6/2011 | Nickolov | G06F 9/4856 707/827 |
| 2012/0084768 | A1* | 4/2012 | Ashok | G06F 9/45558 717/174 |
| 2015/0154042 | A1* | 6/2015 | Katayama | G06F 9/45533 718/1 |
| 2015/0271331 | A1* | 9/2015 | Segre | H04M 3/5232 379/265.09 |

* cited by examiner

*Primary Examiner* — Tesfay Yohannes

(57) ABSTRACT

A cloud computing environment may enable customers to choose between a number of possible bootable images. Bootable images, associated with storage nodes in the cloud computing environment, may be predictively copied to other storage nodes. In one implementation, resource usage, with respect to bandwidth and storage capacity, of the storage nodes, may be monitored. A predictive copy may be initiated when the cloud computing environment begins to operate at a level of resource usage that reduces an ability of the cloud computing environment to instantiate new bootable images, as virtual machines, below a threshold.

18 Claims, 9 Drawing Sheets

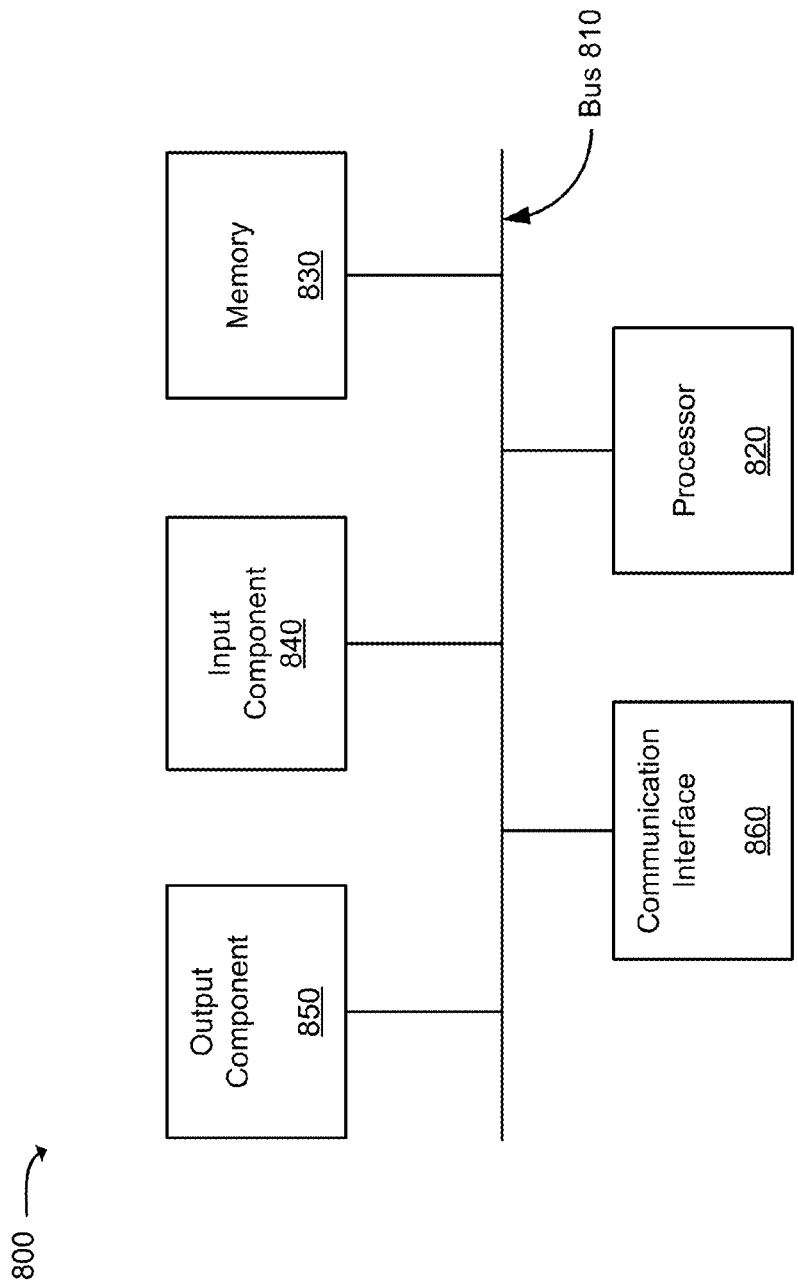

PREDICTIVE WRITING OF BOOTABLE IMAGES TO STORAGE NODES IN A CLOUD COMPUTING ENVIRONMENT

BACKGROUND

The term "cloud computing" refers to the deployment of groups of remote servers and software networks that allow centralized data storage and online access to computer services or resources. Cloud computing relies on the sharing of resources to achieve coherence and economies of scale. A cloud computing provider may operate one or more data centers to provide on-demand access to computing resources.

In some cloud systems, the cloud computing provider may provide customers with a number of bootable images that are used to allow the customer to customize the cloud services used by the customer. Each bootable image may represent on operating system or application stack that can be executed, as a virtual machine, in a stand-alone environment by the cloud computing provider. The cloud computing provider may offer customers the choice between a number of preconfigured bootable images. The customer may be given the choice to choose between bootable images that instantiate different types of operating systems (e.g., different Linux-based operating systems, different Unix-based operating systems, Microsoft Windows operating systems, etc.), each of which may be pre-configured with different default software settings. For example, a web server bootable image may include software components that are commonly used to implement a web server, such as: a Linux-based server operating system, the Apache Hyper-Text Transfer Protocol (HTTP) Server, the MySQL relational database management system, and the PHP programming language.

When initially provisioning a cloud service, a customer may select the desired bootable image and then indicate that the cloud provider should instantiate (i.e., boot) the bootable image. After booting the image, the customer may customize the selected service (e.g., customize the web server to serve the customer's website). It is desirable that the initial instantiation of the bootable image be performed as quickly as possible.

BRIEF DESCRIPTION OF THE DRAWINGS

FIG. 8 is a diagram of example components of a device.

DETAILED DESCRIPTION OF PREFERRED EMBODIMENTS

The following detailed description refers to the accompanying drawings. The same reference numbers in different drawings may identify the same or similar elements.

Techniques described herein relate to a cloud computing environment in which the cloud computing provider enables users (e.g., customers) to choose between a number of possible bootable images to enable cloud services. In particular, data centers may be managed such that bootable images are predictively written to relatively fast storage nodes before the bootable image is requested by the customers and independently of the bootable image being requested by a customer. By pre-writing the bootable images to the storage nodes, particular bootable image, when requested by customer, can be quickly brought online for the customer. In this manner, customers may be provided with a good cloud computing experience.

Figure 1:
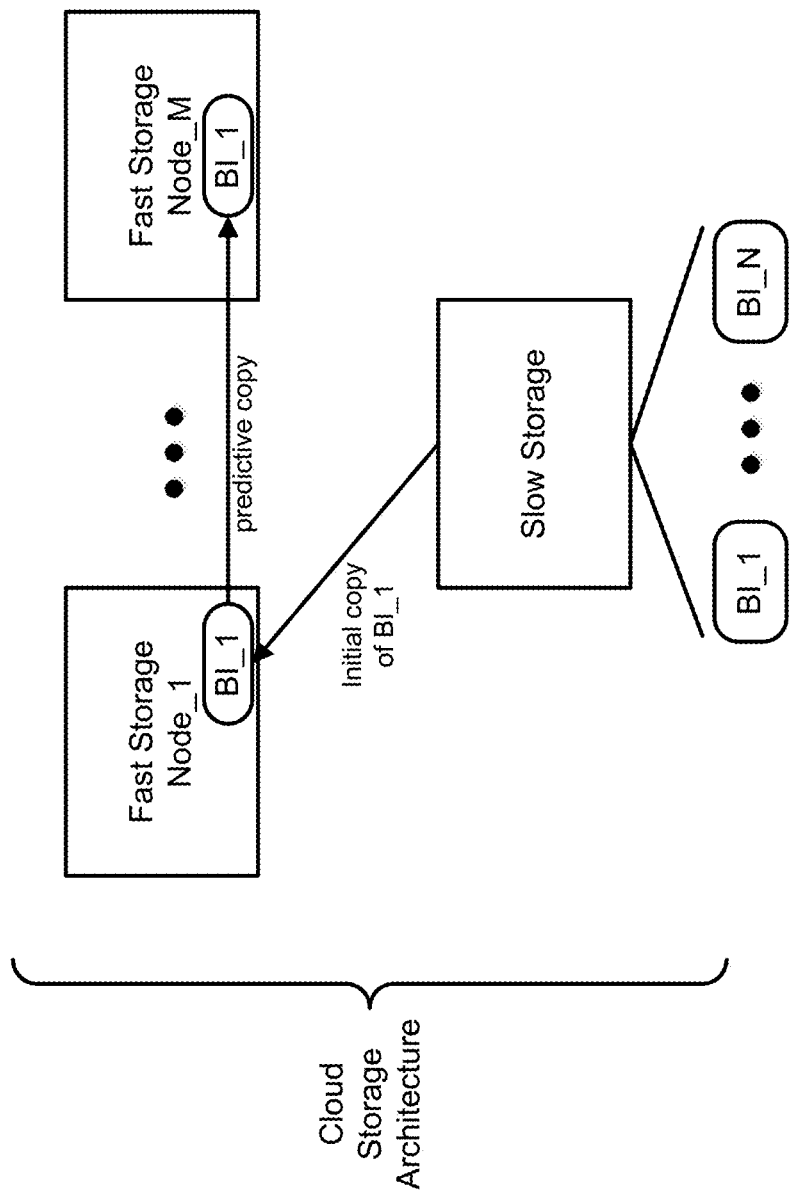
FIG. 1 is a diagram illustrating an example overview of an implementation described herein.

FIG. 1 is a diagram illustrating an example overview of an implementation described herein. A cloud computing environment may include a number of storage and computing resources that are used to provide cloud services. As shown in FIG. 1, a cloud computing environment may include a multi-level storage architecture that includes relatively fast storage elements and slower storage elements. Each of the fast storage elements are illustrated as "fast storage" nodes. A fast storage node may include, for example, high performance non-volatile storage devices, such as Solid State Drives (SSDs). SSDs may use integrated circuits as memory to persistently store data. The slower storage elements are illustrated as "slow storage" in FIG. 1. The slower storage elements may include, for example, magnetic disk drives that include magnetic disks that are rotated in order to retrieve and store data. Magnetic disks may be less expensive but have lower performance (e.g., as measured by access times and throughput rate) than SSDs.

A number of bootable images ("BI") are further shown in FIG. 1 as BI_1 to BI_N (e.g., N may be a positive integer). A bootable image may correspond to a particular operating system (such as an operating system that is preconfigured to perform a particular function), a virtual appliance (e.g., a virtual router or firewall), or another file that represents a boot-enabled data structure from which virtual machines may be generated on behalf of a customer. The complete library of bootable images (e.g., all of the bootable images offered by the cloud computing provider) may be stored in the slow storage elements. When a particular bootable image is requested, by a customer, for the first time, the particular bootable image may be copied ("Initial Copy of BI_1") to a fast storage node (Fast Storage Node_1) and may then be instantiated for use by the customer.

Each fast storage node may be associated with a particular storage capacity (i.e., the total potential storage of the node) and a particular bandwidth capacity. The term "bandwidth" may refer to the maximum data transfer throughput with respect to the storage node communicating with processors or other devices in the data center. Consistent with aspects described herein, the storage usage and bandwidth usage (throughput) of the fast storage nodes may be monitored. Additionally, for each bootable image, the "bootable image spare capacity" may be monitored. The "bootable image spare capacity" may refer to the number of additional bootable images that can be instantiated, for a particular bootable image, without requiring an initial copy of the particular bootable image to be made to a storage node. When the bootable image spare capacity reaches a threshold level, an alternate fast storage node may be selected.

For example, assume that BI_1 is stored at Fast Storage Node_1 and there is room (based on both storage and bandwidth usage of Fast Storage Node_1) for five additional versions of BI_1 to be instantiated at Fast Storage Node_1 (i.e., the bootable image spare capacity of BI_1 equals five).

Assume, however, that the threshold for BI_1 indicates that at least 10 additional versions of BI_1 should be able to be instantiated. In this situation, Fast Storage Node_M may be selected to be used for additional instantiations of BI_1. Once selected, BI_1 may be proactively copied ("predictive copy") to Fast Storage Node_M. Subsequent customer requests to instantiate copies of the bootable image (e.g., BI_1) may be assigned to either Fast Storage Node 1 or Fast Storage Node_M. Because the bootable image BI_1 was already copied to Fast Storage Node_M, the subsequent request, when assigned to Fast Storage Node_M, can be quickly fulfilled. In this manner, by copying BI_1 to a fast storage node in advance of the customer request, cloud performance and be kept at a high level, potentially having a positive impact on the customer experience.

Figure 2:
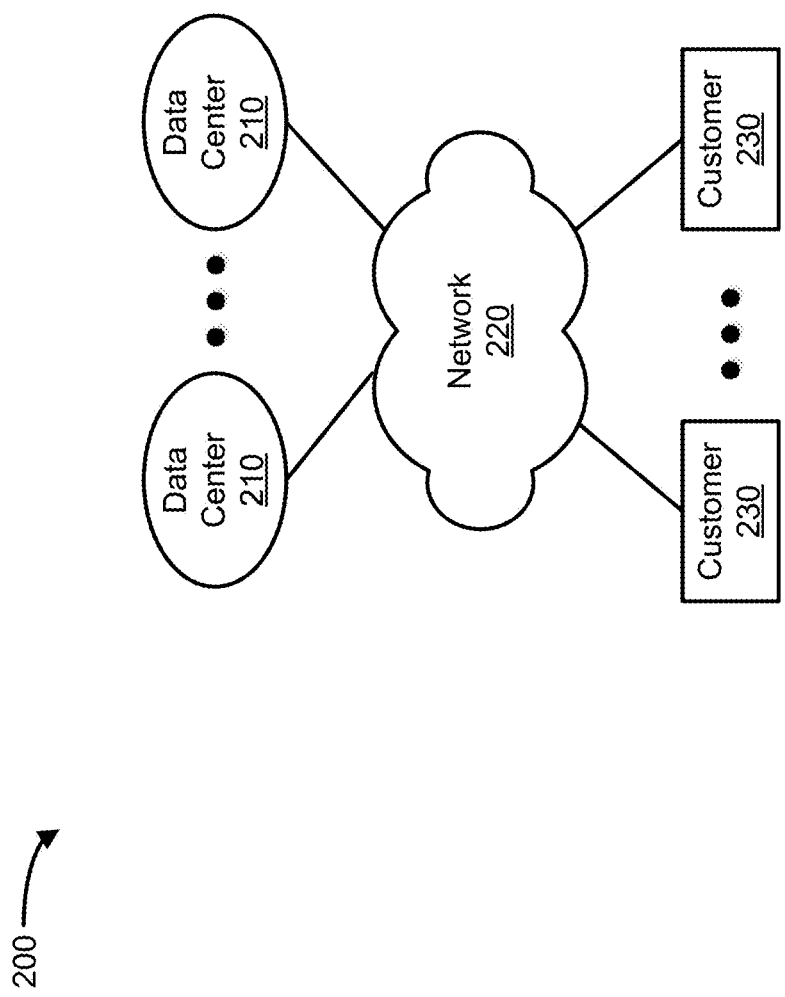
FIG. 2 is a diagram illustrating an example cloud computing environment in which systems and/or methods described herein may be implemented.

FIG. 2 is a diagram illustrating an example cloud computing environment 200 in which systems and/or methods described herein may be implemented. As illustrated, cloud computing environment 200 may include data centers 210, network 220, and customers 230. Data centers 210 may represent geographically distributed data centers that are operated by a cloud computing provider. As described in more detail below, each data center 210 may include computing resources, such as storage devices, processors, and other computing devices through which the cloud computing provider provides online access to computer services and/or resources to customers 230.

Network 220 may represent one or more wired and/or wireless networks that connect data centers 210 and/or customers 230. In one implementation, network 220 may include a public, packet-based network, such as the Internet. Alternatively or additionally, network 220 may represent a private or proprietary network.

Customers 230 may each represent one or more entities that access cloud-based services and/or resources. Customers 230 may use data centers 210 to remotely run application servers (e.g., web servers or other servers), virtual appliances (e.g., virtual routers, files, etc.), or other computing services that are obtained on an on-demand basis from the cloud computing provider. The cloud computing provider may provide an interface through which customers 230 can select particular bootable images as templates from which customers 230 can create the particular services that are desired by the customer.

Figure 3:
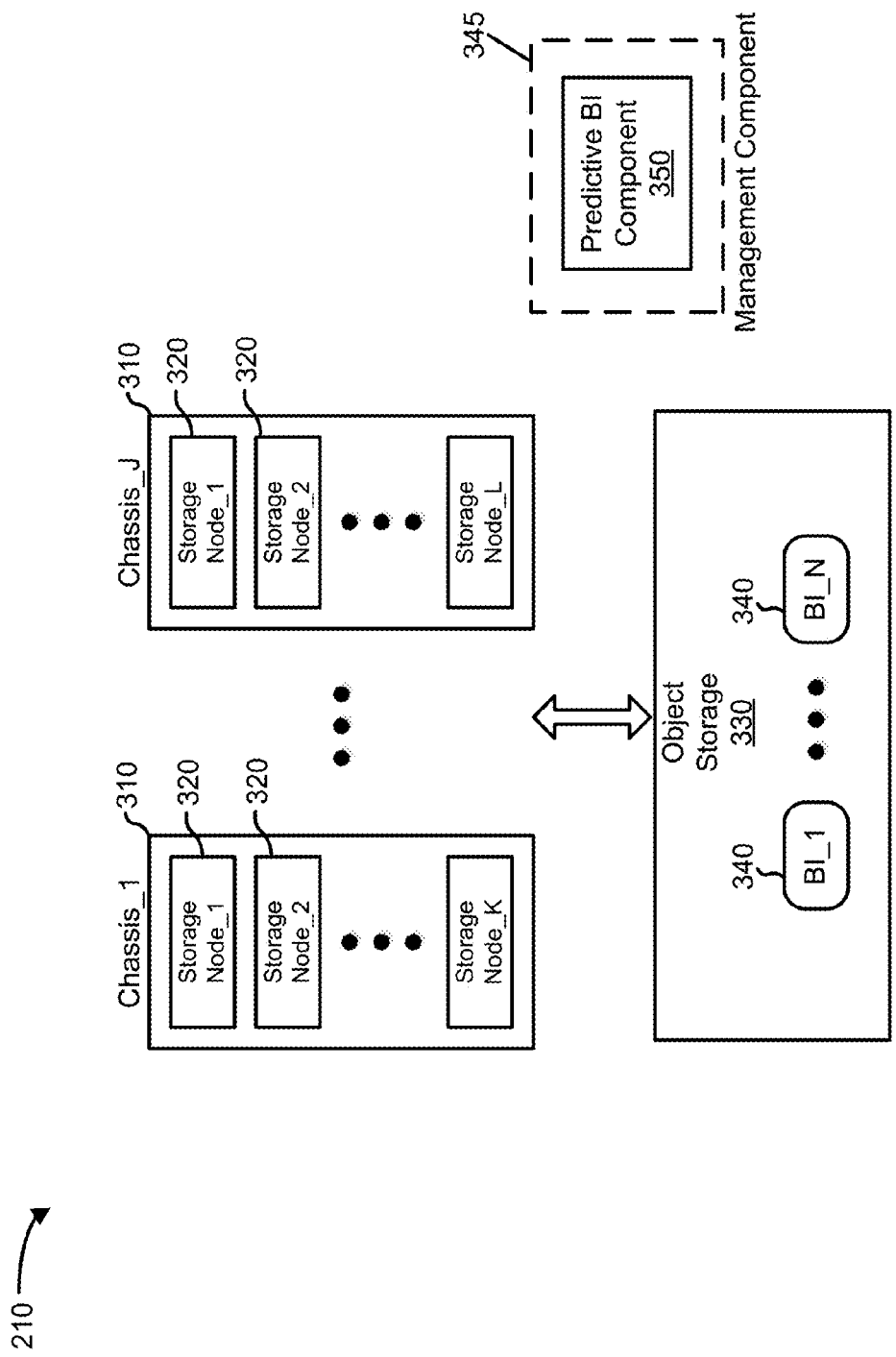
FIG. 3 is a diagram illustrating portions of a data center relating to data storage.

FIG. 3 is a diagram illustrating portions of a data center 210, or multiple data centers 210, relating to data storage. As illustrated, data center 210 may include one or more chassis 310, such as J chassis, where J is a positive integer, object store 330, and management component 345. Management component 345 may particularly include predictive bootable image (BI) component 350. Each chassis 310 may include a number of storage nodes 320. For example, the first chassis, chassis_1, may include K storage nodes 320 (where K is a positive integer) and another chassis, chassis_J, may include L storage nodes 320 (where L is a positive integer).

Each chassis 310 may represent a physical enclosure, such as a metal rack or other supporting structure, that is designed to provide a mount for a number of storage nodes 320. Each storage node 320 may represent one or more hardware devices that are used to mount SSDs (or other high-performance persistent memory stores) and to aggregate the total storage of the mounted SSDs as a single logical storage device. For example, a storage node 320 may be used to mount 10 individual SSDs and provide an output interface that presents the 10 individual SSDs as a single storage device. In some implementations, storage node 320 may implement Redundant Array of Independent Disks (RAID) based storage aggregation and/or error correction services. Chassis 310 and storage nodes 320 may additionally include power and/or network interfaces to provide power to the SSDs and to connect the storage nodes to other devices in data center 210, such as to processors or to network interfaces.

Object storage 330 may represent persistent storage that, relative to the storage devices of storage nodes 320, have lower performance. For example, object storage 330 may include clusters or networks of magnetic disk drives. The magnetic disk drives may generally exhibit lower throughput and longer access times (latency) than SSDs, but may be cheaper (e.g., lower capital cost per unit of storage) than SSDs. Object store 330 may generally be used for archival storage and/or backup storage and may also be referred to herein as an "archival storage component".

As previously mentioned, the cloud computing provider may offer customers 230 a selection of templates from which a customer may configure the cloud services that are desired by the customer. Each template may be a file that represents a bootable image 340 that may correspond to an operating system, a virtual appliance (e.g., a virtual router or firewall), or another file that represents a boot-enabled data structure. Bootable images 340 may be directly executed by processors associated with data centers 210. In FIG. 3, the bootable images are illustrated as bootable image 1 (BI_1) through bootable image N (BI_N), where N is a positive integer. For example, the cloud computing provider may maintain a library of N possible bootable images that can potentially be selected by customers 230 and instantiated by data center 210 to implement a virtual machine that defines a virtual server or appliance that can be controlled by the customer.

Management component 345 may represent one or more hardware devices and/or software processes that are used to control or monitor the operation of data center 210. In some implementations, management component 345 may control the provisioning of hardware and/or software in data center 210. Management component 345 may include, for example, hypervisor software, firmware, or hardware that creates and runs or controls selection and running of virtual machines. Bootable images 340 may each correspond to a file that is used to initialize the operation of a virtual machine.

Predictive BI component 350 may include one or more hardware devices and/or software processes that manage the storage of BIs 340 at storage nodes 320 and object store 330. In one implementation, predictive BI component 350 may be a process associated with management component 345. Alternatively or additionally, predictive BI component 350 may be being implemented as a standalone device or process associated with data center 210. The operation of predictive BI component 350 will be described in more detail below.

The quantity of devices and/or networks, illustrated in FIGS. 2 and 3, is provided for explanatory purposes only. In practice, there may be additional devices and/or networks; fewer devices and/or networks; different devices and/or networks; or differently arranged devices and/or networks than illustrated in FIGS. 2 and 3. Alternatively, or additionally, one or more of the devices of environment 200 may perform one or more functions described as being performed by another one or more of the devices of environment 200.

Figure 4A:
FIGS. 4A and 4B are diagrams illustrating example data structures.

FIG. 4A is a diagram illustrating an example data structure 400. Data structure 400 may be maintained by, for example, predictive BI component 350. Although a number of fields are shown in data structure 400, in other examples, data structure 400 may include fewer or additional fields. Data structure 400 may be particularly used to track bandwidth and storage usage associated with storage nodes 320. Data structure 400 may include a storage node identifier (ID) field, a bandwidth usage field, a storage usage field, and a field to store an indication of which bootable images have been copied to a particular storage node (local BI copy field).

The storage node ID field may identify particular storage nodes 320. For example, storage nodes may be identified by assigned IP addresses, MAC (media access control) addresses, a network name, an assigned label, or other values. In example data structure 400, the labels "Storage_Node_1," "Storage_Node_2," and "Storage_Node_3" are used to distinguish between three different storage nodes 320.

The bandwidth usage field may be used to store the current bandwidth usage (throughput) of a particular storage node 320. Storage nodes 320 may each be associated with maximum throughput (a bandwidth capacity) values with which storage node 320 can provide (or receive) data. The throughput of a particular storage node 320 may be a function of the hardware associated with the storage node and/or with the bandwidth associated with a backend network to which the storage node is connected (or to an interface of the storage node to the backend network). In one implementation, the bandwidth usage of a storage node 320 may be monitored as a portion of the bandwidth capacity associated with the storage node. Alternatively or additionally, the bandwidth usage of the storage node 320 may be measured using other metrics, such as a throughput rate (e.g., a certain number of bytes per second) or another metric. In some implementations, the bandwidth usage may be measured as an average value over a particular period. For example, a measured value of 20% may indicate that, over the last ten seconds, the bandwidth used by the storage node averaged 20% of the bandwidth capacity of the storage node over that period.

The storage usage field may be used to store an indication of the fullness (or emptiness) of a storage node 320. As previously mentioned, each storage node 320 may be associated with a number of storage devices (e.g., SSDs) that collectively determine a particular total storage capacity of the storage node. In one implementation, the storage usage of a storage node 320 may be monitored as a portion of the total storage capacity associated with the storage node. Alternatively or additionally, the storage usage of storage node 320 may be measured using other metrics, such as the amount of free space (e.g., in bytes) or another metric. For example, a measured value of 20% may indicate that the storage node is 20% full. In some implementations, the storage usage may be measured as an average value over a particular period.

As will be described in more detail below, bootable images may, at certain times, be copied from one storage node 320 to another or from object store 330 to a storage node. Local BI copy field may be used to store an indication of which bootable images are currently available as a local copy at a particular storage node. A local copy of a bootable image may enhance data center performance when a customer causes a bootable image to be initially instantiated (i.e., initially booted) by data center 310.

Figure 4B:

FIG. 4B is a diagram illustrating an example data structure 450. Data structure 450 may be maintained by, for example, predictive BI component 350. Although a number of fields are shown in data structure 450, in other examples, data structure 450 may include fewer or additional fields. Data structure 450 may be particularly used to track usage statistics on a per-bootable image basis. Data structure 450 may include a Bootable Image identifier (ID) field, a Current Number of Instantiated Images field, and a Size field. The Bootable Image ID field may indicate the bootable image associated with a particular record (row) of data structure 450.

The Current Number of Instantiated Images field may be used, by predictive BI component 350, to keep track of the total number of instantiated images for a particular bootable image. For example, assume a local copy of BI_1 is present at Storage Node_1 and Storage Node_2 and that BI_1 has been instantiated 10 times at Storage Node_1 and 15 times at Storage Node_2. The total number of instantiated images for BI_1, in data center 210, may thus be 25. As further shown in the example of data structure 450, the total number of instantiated images for BI_2 may be 100 and the total number of instantiated images for BI_3 may be 30. The number of instantiated images, for any particular bootable image, may increase and decrease as customers instantiate new bootable images (i.e., create new virtual machine) and delete previously instantiated bootable images, respectively.

The Size field may be used to store the size (e.g., in gigabytes (GB)) of each bootable image. For example, as shown, BI_1 may be 5 GB, BI_2 may be 3.5 GB, and BI_3 may be 7 GB. Each time a bootable image is instantiated, a local copy of the bootable image (i.e., at the storage node) may be made. Thus, each instantiation of a bootable image may use up an amount of disk storage space that equal to the size of the bootable image.

Figure 5:
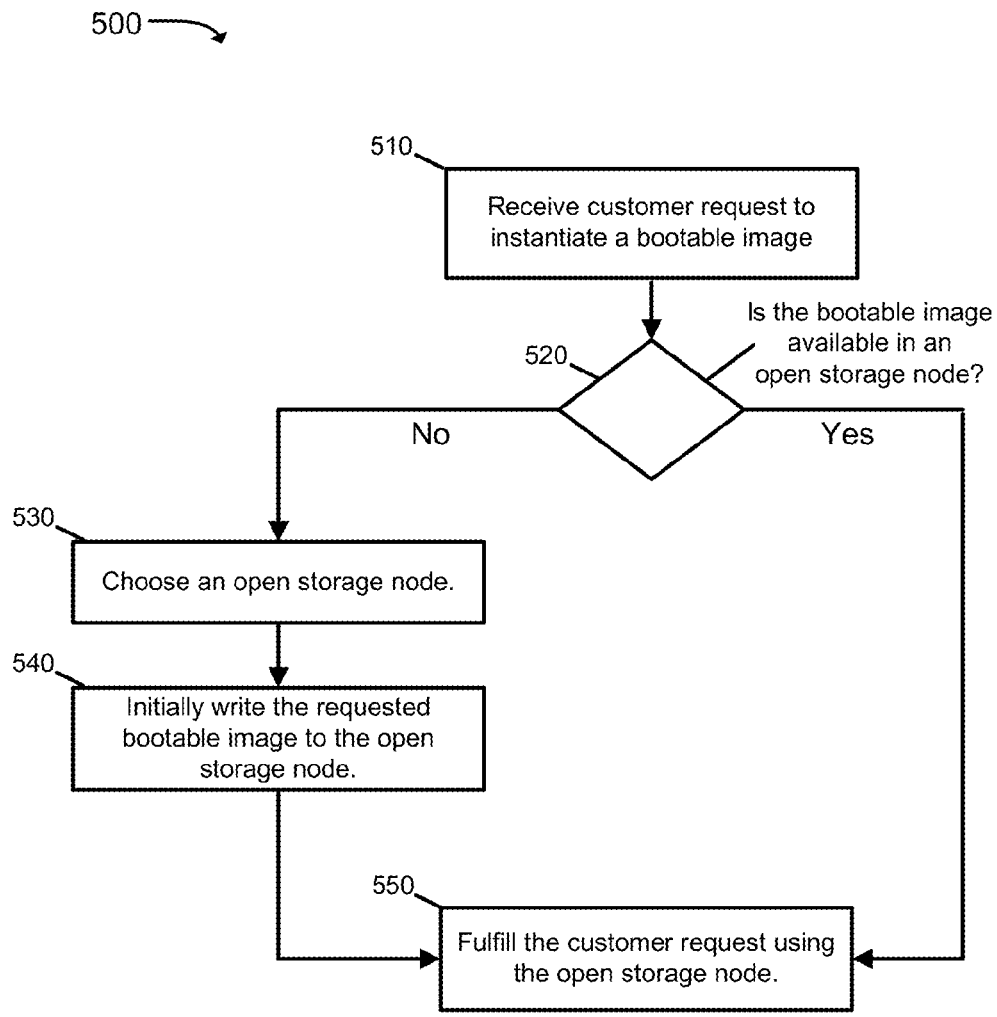
FIG. 5 is a flow chart illustrating an example process for instantiating bootable images in a data center.

FIG. 5 is a flow chart illustrating an example process 500 for instantiating bootable images in data center 210. Process 500 may be performed by, for example, management component 345 and/or predictive BI component 350. Alternatively or additionally, process 500 may also be performed by one or more additional devices associated with data center 210.

Process 500 may include receiving customer requests to instantiate bootable images (block 510). As mentioned, the cloud computing provider may provide a "library" of bootable images that customers may select as a starting point when configuring their cloud computing services. Each bootable image may thus act as a template that a customer can instantiate and configure as needed. A graphical interface, such as one provided through a web interface, may be provided by the cloud computing provider to allow customers to select the desired bootable image.

Process 500 may further include determining whether the requested bootable image is available in an open storage node (block 520). An "open" storage node, as used herein, may refer to a storage node that has enough capacity (e.g., bandwidth and/or storage capacity) to execute a new bootable image associate with a customer. As one example, a storage node 320 may be considered open when both the current bandwidth usage and storage usage of storage node 320 are below thresholds (e.g., 80%). As another example, a storage node may be considered open when the size of the bootable image that is to be instantiated is less than the spare storage capacity of the storage node. In some implementations, the bandwidth usage of a storage node may be used to calculate an "effective" spare storage capacity of a storage node. In one implementation, if the bandwidth usage of a storage node is at 90%, the effective spare storage capacity of the storage node may be set to the lesser of the actual spare storage capacity or 10% of the total storage capacity. Thus, for example, if a particular storage node is associated with 10 terra bytes (TB) of total storage capacity but the bandwidth usage of the particular storage node is at 90%, the effective spare storage capacity may be assumed to be 1 TB even if the actual spare storage capacity of the particular storage node is greater than 1 TB (e.g., the particular storage node may be only half full and thus have 5 TB of actual spare storage capacity).

Due to the predictive writing of bootable images, and as will be described in more detail with respect to FIG. 6, in normal operation of data center 210, there may always be at least one storage node that is open and that has a local copy of a bootable image. In one implementation, an exception to this may be the initial instantiation of a particular bootable image. That is, until at least one customer of the cloud computing provider requests a particular bootable image, the particular bootable image may only be stored in object store 330 (i.e., the particular bootable image may not be locally available at a storage node 320 until at least one customer has requested the bootable image).

When the requested bootable image is not available at an open storage node (block 520—No), process 500 may include choosing an open storage node (block 530). Choosing an open storage node may include selecting one of storage nodes 320 as a storage node that has enough capacity to execute the new bootable image. In one implementation, the chosen storage node may be chosen as the most lightly loaded storage node 320. In another possible implementation, the chosen storage node may be randomly selected from among the set of storage nodes 320 that are below a threshold level of usage (with respect to bandwidth and/or storage). As mentioned above, in one implementation, due to the predictive writing of bootable images, block 530 may normally only be reached when a bootable image is requested for the first time by any customer.

Process 500 may further include initially writing the requested bootable image to the chosen open storage node (block 540). Writing the requested bootable image to the open storage node may include copying the requested bootable image from object store 330 to the selected open storage node 320. The initial writing of the requested bootable image, because it is performed from the relatively slow object store (e.g., from hard disk drives), may be associated with a relatively long latency before the bootable image is usable by the customer.

When the requested bootable image is available in an open storage node (block 520—Yes), or after the performance of block 530, process 500 may include fulfilling the customer request using the open storage node (block 550). Fulfilling the request may include, for example, creating a local customer copy of the bootable image at the open storage node and initiating instantiation (i.e., booting) of the bootable image. Because storage nodes 320 may be implement using relatively fast persistent storage, such as SSD based storage, creating a local copy of the bootable image may be a relatively fast process. Advantageously, the instantiation of the bootable image may occur quickly and the customer can begin to quickly use the instantiated bootable image. This may be particularly true when the bootable image was determined to be available in an open storage node (i.e., when the result of block 520 is Yes).

Figure 6:
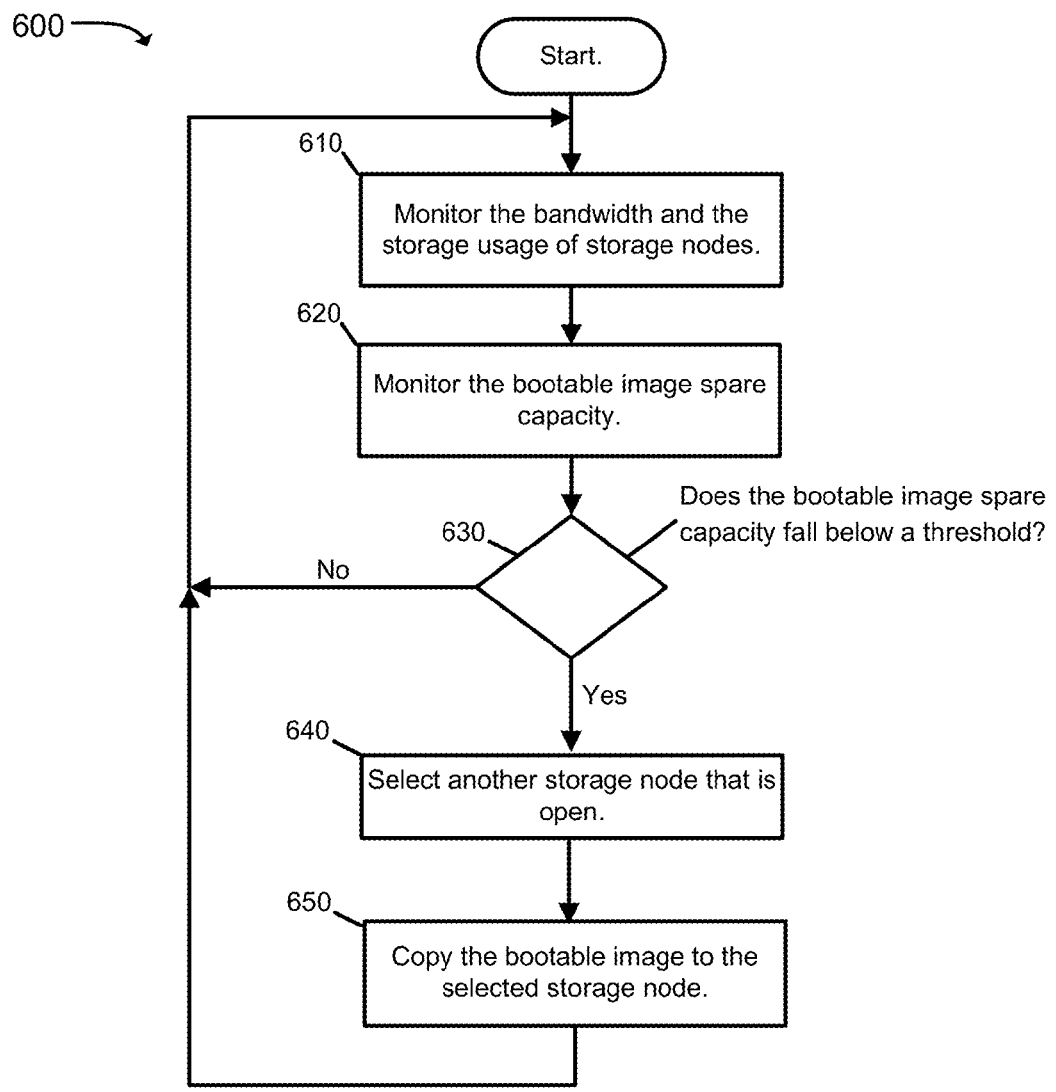
FIG. 6 is a flow chart illustrating an example process for predictively writing bootable images to storage nodes.

FIG. 6 is a flow chart illustrating an example process 600 for predictively writing bootable images to storage nodes. Process 600 may be performed by, for example, predictive BI component 350. Alternatively or additionally, process 600 may also be performed by one or more additional devices associated with data center 210.

Process 600 may include monitoring the bandwidth and storage usage of the storage nodes (block 610). Predictive BI component 350 may receive bandwidth and storage usage information from storage nodes 320 and, based on the information, maintain a data structure, such as data structure 400, that indicates the current bandwidth and storage load of storage nodes 320. As previously mentioned, the bandwidth usage and storage loads may be tracked, by predictive BI component 350, as a percentage of the capacity of the corresponding storage nodes 320. Alternatively or additionally, other metrics or units of measurement may be used to track the load or fullness of storage nodes 320. For example, predictive BI component 350 may track the amount of free storage space available (e.g., the number of bytes available) and the percentage of bandwidth usage for each storage node. In another possible implementation, other factors, such as latency of storage nodes 320, read/write errors received from storage nodes 320, etc., may be tracked.

Process 600 may further include monitoring the bootable image spare capacity (block 620). As previously mentioned, for a particular bootable image, the "bootable image spare capacity" may refer to the number of additional bootable images that can be instantiated at the storage nodes that include at least one copy of the particular bootable image. The bootable image spare capacity may be monitored on a per-bootable image basis. In one implementation, predictive BI component 350, for each bootable image, may determine the bootable image spare capacity based on the spare storage capacity of each of the storage nodes at which the bootable image is present. For example, assume that a copy of BI_1 is present at three different storage nodes, which have spare storage capacity of 10 GB, 20 GB, and 30 GB, respectively. If BI_1 requires 5 GB, the bootable image spare capacity for BI_1 may be estimated as 12 (10/5+20/5+30/5).

Process 600 may further include determining whether the bootable image spare capacity falls below a threshold (block 630). The determination may be made on a per-bootable image basis. In one implementation, the threshold may be determined based on the current number of instantiated images for a particular bootable image. For example, a 20% (or other number) excess bootable image capacity may be desired. Accordingly, the threshold may be set at 20% of the current number of instantiated images for the particular bootable image. As a concrete example, if the current number of instantiated images (across all storage nodes 320) for BI_2 is 100, the threshold for BI_2 may be set to 20 (i.e., the system should be able to support 120 instantiations of BI_2). Block 630, for BI_2, may thus involve comparing the bootable image spare capacity for BI_2 to 20.

When the bootable image spare capacity falls below the threshold (block 630—Yes), process 600 may further include selecting another storage node that is open (block 630—Yes, and block 640). This may correspond to a situation in which predictive BI component 350 has determined to predictively copy a bootable image to a new storage node. In one implementation, predictive BI component 350 may select the other (new) storage node as the storage node, from among all active storage nodes, that has the lowest level of storage and/or bandwidth usage (and that does not already have a copy of the bootable image). Alternatively or additionally, other techniques may be used to select the other storage node (e.g., random selection among the open nodes, selection based on the types of processes that are being executed at the other storage nodes, etc.).

Process 600 may further include copying the bootable image to the selected storage node (block 650). In one implementation, the copying may be performed between storage nodes 320, such as from the storage node that was determined to no longer be open to the selected storage node. Alternatively or additionally, the copying may be performed between object stores 330 and the selected storage node(s). Because the copying is a predictive copy that is performed before the bootable image is requested by a customer, the speed of the copy operation may not be a critical factor.

Predictive BI component 350 may additionally update data structures 400 and/or 450, such as the local BI copy field, to indicate the bootable images that have been copied to new storage nodes 320.

In alternative implementations, techniques other than comparing the bootable image spare capacity to a threshold may be used to determine when to predictively copy a bootable image. For example, the bootable images that are stored at a particular storage node may be predictively copied whenever the particular storage node becomes full or becomes "full" relative to a threshold level of fullness (e.g., whenever a storage node usage is at either 80% of storage or bandwidth capacity, the bootable images at the storage node may be copied to other open storage nodes).

Figure 7:
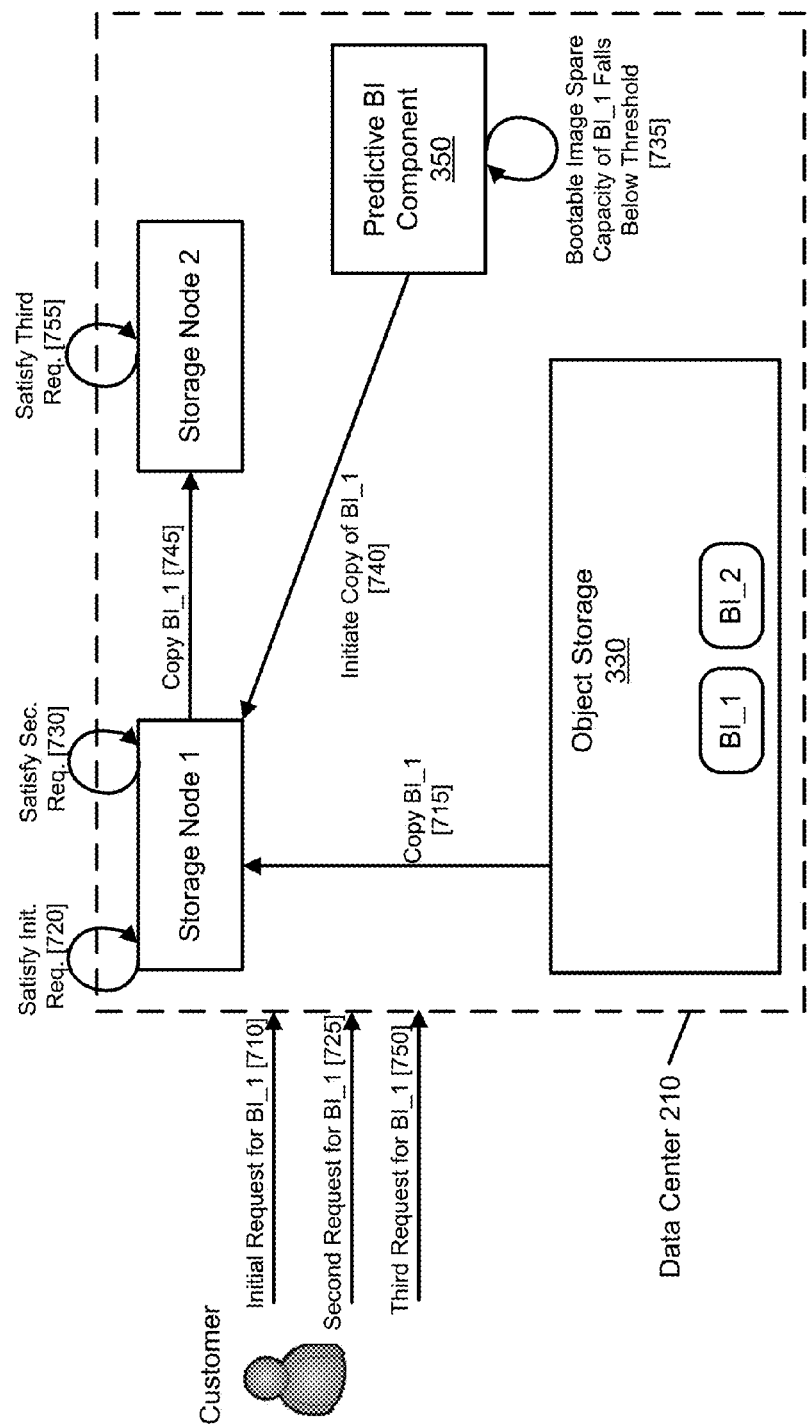
FIG. 7 is a diagram illustrating an example of the operation of the processes shown in FIGS. 5 and 6.

FIG. 7 is a diagram illustrating an example of the operation of processes 500 and 600. As illustrated in FIG. 7, data center 210 includes object store 330, predictive BI component 350, and two storage nodes, shown as Storage Node 1 and Storage Node 2. Object store 330 may include two bootable images, BI_1 and BI_2. Storage Node 1 and Storage Node 2 may not initially include any copies of BI_1 or BI_2.

Assume a customer (e.g., a computing device associated with a customer) requests instantiation of a particular bootable image, BI_1 (at 710, "Initial Request for BI_1"). The request may be assigned to Storage Node 1, which does not include a copy of BI_1. Accordingly, BI_1 may be copied from object store 330 to Storage Node 1 (at 715, "Copy BI_1"). The copy of BI_1, in Storage Node 1, may be used to satisfy the customer's request for the bootable image (at 720, "Satisfy Init. Req."). That is, a virtual machine may be created, for the customer, using the copy of BI_1.

At some point, the customer (or another customer) may request that a second copy of BI_1 be instantiated (at 725, "Second Request for BI_1"). The request may be assigned to Storage Node 1. Because Storage Node 1 includes a copy of BI_1, the request can be efficiently satisfied by Storage Node 1 (at 730, "Satisfy Sec. Req."). For instance, a local copy of BI_1 may be made, in Storage Node 1, using the relatively fast SSDs of Storage Node 1.

Predictive BI component 350 may monitor the storage and or bandwidth usage levels of Storage Node 1 and Storage Node 2, and the bootable image spare capacity of BI_1. At some point, predictive BI component 350 may determine that the bootable image spare capacity of BI_1 falls below a threshold (at 735, "Bootable Image Spare Capacity of BI_1 Falls Below Threshold"). For example, assume that predictive BI component 350 determines that the threshold spare capacity for BI_1 should initially be 10. That is, data center 210 should have enough spare capacity to create 10 additional instantiations of BI_1 without having to copy BI_1 between storage nodes. Further, assume that Storage Node 1 initially has enough additional storage and/or bandwidth spare capacity to locally instantiate the 10 additional instantiations of BI_1, but at some point, due to the instantiation of other bootable images at Storage Node 1, Storage Node 1 no long has enough spare capacity to locally instantiate the 10 additional instantiations of BI_1. Based on this determination, predictive BI component 350 may determine to proactively (predictively) copy BI_1 into Storage Node 2. Predictive BI component 350, or another device or process associated with data center 210, may cause a copy of BI_1 to be made at Storage Node 2 (at 740, "Initiate Copy of BI_1," and 745, "Copy BI_1"). Although a copy of BI_1 is illustrated in FIG. 7 as being made from Storage Node 1 to Storage Node 2, a copy of BI_1 could alternatively be made from object store 330 to Storage Node 2. At this point, the bootable image spare capacity of BI_1 would be calculated as the sum of the bootable image spare capacity of BI_1 at Storage Node 1 and Storage Node 2.

At some point, the customer (or another customer) may request that a third copy of BI_1 be instantiated (at 750, "Third Request for BI_1"). The request may be satisfied using either Storage Node 1 or Storage Node 2 (assuming both have spare capacity to instantiate another copy of BI_1). Because Storage Node 1 and Storage Node 2 already include a copy of BI_1, the request can be efficiently satisfied. In this example, assume the request is satisfied at Storage Node 2 (at 755, "Satisfy Third Req."). Advantageously, and in the manner described above, storage nodes in data center 210 may be maintained in a way that minimizes latency associated with instantiating bootable images that are requested by customers.

FIG. 8 is a diagram of example components of a device 800. One or more of the devices described above (e.g., as described with respect to FIGS. 1-3 and/or 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may include processing circuitry to interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, a Wi-Fi radio (e.g., an IEEE 802.11-based radio), a cellular radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 820 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 6, the order of the blocks may be modified in other implementations. Further, non-dependent blocks may be performed in parallel. In some implementations, additional blocks may be performed before, after, or in between the described blocks.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system comprising:
    an archival storage component to store a library of bootable images that are offered by a cloud computing data center;
    a first storage node, in the cloud computing data center, the first storage node including a copy of a particular bootable image from the library of bootable images;
    a second storage node in the cloud computing data center; and
    one or more processors to execute processor executable instructions to:
        monitor resource usage of the first and second storage nodes;
        determine, based on the monitoring, a bootable image spare capacity of the particular bootable image, the bootable image spare capacity for the particular bootable image being defined as an amount of bootable images that can be instantiated using the first storage node, as virtual machines, based on the particular bootable image, without requiring an initial copy of the particular bootable image to be copied to the second storage node;
        determine when the bootable image spare capacity of the particular bootable image is below a threshold value, wherein the threshold value, for the particular bootable image, is based on a number of virtual machines that are currently instantiated based on the particular bootable image; and
        initiate, based on determination that the bootable image spare capacity is below the threshold value, copying of the particular bootable image to the second storage node, the initiation of the copying being performed prior to and independently of the particular bootable image being instantiated based on using the second storage node.

2. The system of claim 1, wherein monitoring the resource usage of the first and second storage nodes includes monitoring bandwidth and storage usage for the first and second storage nodes.

3. The system of claim 1, wherein the one or more processors are further to execute the processor executable instructions to:
    receive a request, from a customer of the cloud computing data center, to instantiate the particular bootable image as a virtual machine;
    identify, in response to the request from the customer, the second storage node as a storage node that includes the copy of the particular bootable image and that has sufficient storage and bandwidth capacity to instantiate the particular bootable image as a virtual machine; and
    fulfill, based on the identification of the second storage node, the customer request.

4. The system of claim 1, wherein the first and second storage nodes use Solid State Drives (SSDs) for storage and the archival storage component uses hard disk drives for storage.

5. The system of claim 1, wherein the first and second storage nodes include storage devices with higher performance than performance of storage devices in the archival storage component.

6. The system of claim 1, wherein initiating the copying of the particular bootable image to the second storage node includes initiating the copying from the archival storage component to the second storage node.

7. The system of claim 1, wherein initiating the copying of the particular bootable image to the second storage node includes initiating the copying from the first storage node to the second storage node.

8. A method, implemented by one or more devices, comprising:
   monitoring resource usage of a plurality of storage nodes in a cloud computing environment;
   determining, based on the monitoring, a bootable image spare capacity of a particular bootable image, the bootable image spare capacity for the particular bootable image being defined as an amount of bootable images that can be instantiated, as virtual machines, using the plurality of storage nodes, and based on the particular bootable image, without requiring an initial copy of the particular bootable image to be copied to one of the plurality of storage nodes;
   determining when the bootable image spare capacity of the particular bootable image is below a threshold value, wherein the threshold value, for the particular bootable image, is based on an amount of virtual machines that were instantiated based on the particular bootable image;
   initiating, based on a determination that the bootable image spare capacity is below the threshold value, copying of the particular bootable image to a selected one of the plurality of storage nodes that does not include a copy of the particular bootable image, the initiation of the copying being performed prior to and independently of the particular bootable image being instantiated, as a bootable image, at the selected one of the plurality of storage nodes.

9. The method of claim 8, wherein monitoring the resource usage of the first and second nodes includes monitoring bandwidth and storage usage for the first and second storage nodes.

10. The method of claim 8, further comprising:
    receiving a request, from a customer of a cloud computing data center, to instantiate the particular bootable image as a virtual machine;
    identifying, in response to the request from the customer, the selected one of the plurality of storage nodes; and
    fulfilling, based on the identification and using the selected one of the plurality of storage nodes, the customer request.

11. The method of claim 8, wherein the initiating of the copying of the particular bootable image to the selected one of the plurality of storage nodes includes initiating the copying from an archival storage component or from another one of the plurality of storage nodes, to the second storage node.

12. The method of claim 9, further comprising:
    selecting the selected one of the plurality of storage nodes as a storage node that is associated with a minimum amount of resource usage of the plurality of storage nodes.

13. A device comprising:
    a non-transient computer readable medium containing program instructions; and
    processing circuitry to execute the program instructions to:
       monitor bandwidth resource usage of a plurality of storage nodes associated with a cloud computing environment;
       monitor storage resource usage of the plurality of storage nodes associated with the cloud computing environment;
       determine when, based on the monitoring of the bandwidth and storage resource usage, the cloud computing environment begins to operate at a level of resource usage that reduces an ability of the cloud computing environment to instantiate new bootable images, as virtual machines, below a threshold, the determination being based on a calculation of a bootable image spare capacity as an amount of bootable images that can be instantiated, using the plurality of storage nodes, as new bootable images without requiring copying of a bootable image to a storage node, of the plurality of storage nodes, that does not already have a copy of the bootable image, wherein the threshold is determined based on a number of virtual machines that are currently instantiated based on the bootable images;
       select, in response to the determination that the ability of the cloud computing environment to instantiate new bootable images is below the threshold, a storage node, of the plurality of storage nodes, that does not already have a copy of the bootable image; and
       initiate, based on the selection of the selected storage node, copying of one or more bootable images, to the selected storage node.

14. The device of claim 13, wherein the initiation of the copying is performed prior to and independently of the bootable images being instantiated using the selected storage node.

15. The device of claim 13, wherein initiating the copying includes performing the copying from an archival storage component to the particular storage node.

16. The device of claim 15, wherein the plurality of storage nodes include higher performance storage devices than storage devices in the archival storage component.

17. The device of claim 13, wherein the processing circuitry is further to execute the program instructions to:
    receive a request to instantiate one of the bootable images as a virtual machine;
    identify, in response to the request, the selected storage node; and
    fulfill, using the one of the bootable images at the selected storage node, the request.

18. The device of claim 13, wherein the thresholds are determined on a per-bootable image basis.

* * * * *